US010592473B2

(12) United States Patent
Tiwari et al.

(10) Patent No.: US 10,592,473 B2
(45) Date of Patent: Mar. 17, 2020

(54) METHOD FOR IMPROVING ENERGY EFFICIENCY OF MAP-REDUCE SYSTEM AND APPARATUS THEREOF

(71) Applicant: Infosys Limited, Bangalore (IN)

(72) Inventors: Nidhi Tiwari, Bangalore (IN); Santonu Sarkar, Bangalore (IN)

(73) Assignee: Infosys Limited, Bangalore (IN)

( * ) Notice: Subject to any disclaimer, the term of this patent is extended or adjusted under 35 U.S.C. 154(b) by 345 days.

(21) Appl. No.: 14/832,690

(22) Filed: Aug. 21, 2015

(65) Prior Publication Data
US 2016/0078069 A1 Mar. 17, 2016

(30) Foreign Application Priority Data
Sep. 11, 2014 (IN) .......................... 4456/CHE/2014

(51) Int. Cl.
*G06F 16/17* (2019.01)
*G06F 1/324* (2019.01)
*G06F 1/3203* (2019.01)

(52) U.S. Cl.
CPC ........ *G06F 16/1737* (2019.01); *G06F 1/3203* (2013.01); *G06F 1/324* (2013.01); *G06F 16/1734* (2019.01); *Y02D 10/126* (2018.01)

(58) Field of Classification Search
CPC ...... G06F 1/324; G06F 1/3203; G06F 9/5061; G06F 2216/05; Y02D 10/124; Y02D 10/126; Y02D 10/22; Y02D 10/36
See application file for complete search history.

(56) References Cited

U.S. PATENT DOCUMENTS 8,132,031 B2 3/2012 Barsness et al.
2006/0218551 A1* 9/2006 Berstis .................. G06F 9/4881
718/102
(Continued)

FOREIGN PATENT DOCUMENTS

CN 102004670 * 4/2011 ............... G06F 9/50
CN 102004670 B 12/2012
(Continued)

OTHER PUBLICATIONS

Wirtz T, Rong Ge, Improving MapReduce Energy Efficiency for Computation Intensive Workloads, Jul. 1, 2011, IEEE, 2011 International Green Computing Conference and Workshops, pp. 1-8 (Year: 2011).*

(Continued)

*Primary Examiner* — James Trujillo
*Assistant Examiner* — Michal Bogacki
(74) *Attorney, Agent, or Firm* — Klarquist Sparkman, LLP

(57) ABSTRACT

This technique improves energy efficiency of MapReduce system by using system performance model without changing any component of the MapReduce system. This involves determining presence of any hardware bottleneck in any node of MapReduce system based on a system performance model and if any hardware bottleneck is present in any node, then the maximum bandwidth value of hardware associated with the bottleneck of each node is determined. Thereafter, an energy efficient value of Central Processing Unit (CPU) frequency of each node having the bottleneck is determined by using the system performance model and the maximum bandwidth value of hardware associated with the bottleneck. Further, the CPU frequency of each node having the bottleneck is set at the energy efficient value determined in the earlier step.

20 Claims, 5 Drawing Sheets

(56) References Cited

U.S. PATENT DOCUMENTS

| | | | |
|---|---|---|---|
| 2009/0083717 A1* | 3/2009 | Branson | G06F 11/3428 717/130 |
| 2011/0271283 A1 | 11/2011 | Bell, Jr. et al. | |
| 2012/0131591 A1* | 5/2012 | Moorthi | G06Q 10/06 718/104 |
| 2013/0185729 A1* | 7/2013 | Vasic | G06F 9/5072 718/104 |
| 2013/0191843 A1* | 7/2013 | Sarkar | G06F 9/505 718/105 |
| 2013/0339973 A1* | 12/2013 | Mitchell | G06F 9/50 718/104 |
| 2015/0100971 A1* | 4/2015 | Dube | G06F 9/4881 719/319 |
| 2015/0120637 A1* | 4/2015 | Eom | G06N 5/025 706/47 |
| 2015/0277990 A1* | 10/2015 | Xiong | G06F 9/52 718/106 |
| 2015/0331913 A1* | 11/2015 | Borowiec | H03M 7/3079 707/693 |

FOREIGN PATENT DOCUMENTS

| | | | | |
|---|---|---|---|---|
| CN | 103279330 | * | 5/2013 | Y02B 60/146 |
| CN | 103279330 A | | 9/2013 | |

OTHER PUBLICATIONS

Wirtz, Thomas S., "Energy Efficient Data-Intensive Computing With Mapreduce" (2013). Master's Theses (2009 ). Paper 211. http://epublications.marquette.edu/theses_open/211.
Eugen Feller et al., "On the Performance and Energy Efficiency of Hadoop Deployment Models", version 1—Oct. 8, 2013.

* cited by examiner

METHOD FOR IMPROVING ENERGY EFFICIENCY OF MAP-REDUCE SYSTEM AND APPARATUS THEREOF

RELATED APPLICATION DATA

This application claims priority to India Patent Application No. 4456/CHE/2014, filed Sep. 11, 2014, the disclosure of which is hereby incorporated by reference in its entirety.

FIELD OF THE INVENTION

This invention relates generally to improve energy efficiency of MapReduce system, and in particular, to a method and apparatus for improving energy efficiency of MapReduce system by using system performance model and frequency scaling.

BACKGROUND

MapReduce is a well-known programming model and implementation for processing and large data sets with a parallel, distributed algorithm on a cluster. MapReduce has become ubiquitous for processing large data volume jobs. An important aspect of MapReduce is that the size of the clusters is often in hundreds or thousands, while it is used for processing infrequent batch and interactive jobs in parallel across multiple machines. The large number of machines in cluster consume a high amount of power, so it is important to utilize them optimally for the specific task.

Known techniques for improving energy efficiency of MapReduce projects include reducing ideal periods on nodes by having lesser number of active nodes in cluster. This is achieved by using job consolidation, data re-distribution and nodes re-configuration. The present techniques alter the design of either one or both of the two underlying frameworks, i.e. a Hadoop Distributed File System (HDFS) cluster and a MapReduce programming model. The current techniques for improving energy efficiency of MapReduce can be classified as MapReduce programming model modification techniques, HDFS cluster modification techniques and nodes or tasks classification and frequency scaling techniques.

The MapReduce programming model modification techniques do workload consolidation or distribution either based on workload characteristics and/or hardware characteristics. A simple way is to consolidate workload on fewer servers and put idle servers in sleep mode. To realize this, multiple dynamic workload placement and Virtual Machine (VM) consolidation techniques have been used. The HDFS cluster modification techniques work by consolidating the data of use on fewer active nodes so that other nodes can be put in sleep mode. For this, the data placement is altered, i.e. the data distribution strategy of the cluster is modified. The data is segregated either to ensure one replica or to ensure critical data availability. In nodes or tasks classification techniques the nodes are classified based on their Central Processing Unit (CPU) speed and used to run map/reduce tasks. So, map tasks are considered to be CPU intensive and scheduled on faster nodes, while reduce tasks are scheduled on low speed and low power nodes. In frequency scaling techniques, the frequency scaling is done based on the type of the tasks running on node. High frequency is maintained for map and reduce tasks, low frequency for shuffle tasks and idle durations.

There are drawbacks of the above mentioned techniques. The workload redirection and server shutdown techniques work well for workloads which are not data intensive and access little required data from remote databases so are not bound to any machine. But these techniques often are not easily applied to MapReduce applications due to its distributed nature and the fact that computation is bound to a machine. Thus the existing methods described above trade-off either performance or data availability to achieve energy efficiency. The frequency scaling methods take a blanket approach to schedule map/reduce tasks and scale frequency based on heuristic nature of map/reduce tasks. These heuristics do not always yield optimal results. Also, they don't work well in multiple jobs scenarios where map, reduce and shuffle tasks of different jobs may be running in parallel. In such cases, the frequency scaling approach highly impacts the performance of the project.

SUMMARY

The disclosed embodiments overcome the above mentioned drawbacks by using the bottlenecks in the MapReduce system to improve energy efficiency of the system without impacting the performance of the job and data availability. Additionally, this technique helps in reducing the power consumption of the data centers and thus reduce operation cost of the data centers.

According to an embodiment, a method for improving energy efficiency of MapReduce without changing any component of the MapReduce system is disclosed. The method includes determining presence of a hardware bottleneck in at least one node of the MapReduce system based on wait time of an application to be executed in the at least one node and the resource utilization vale of the at least one node obtained by using a system performance model. Then, maximum bandwidth value of hardware associated with the bottleneck for the at least one node is obtained by running one or more benchmarks on the at least one node. Thereafter, energy efficient frequency of central processing unit (CPU) for the at least one node to remove the bottleneck is determined by using data throughput value of the at least one node obtained from the system performance model the system performance model and the maximum bandwidth value of the hardware of the at least one node associated with the bottleneck. Further, the CPU frequency of the at least one node is set at the energy efficient CPU frequency determined in the earlier step.

In an additional embodiment, an apparatus for improving energy efficiency of MapReduce without changing any component of the MapReduce system is disclosed. The apparatus includes a memory coupled to one or more processors which are configured to execute programmed instructions stored in the memory including determining presence of a hardware bottleneck in at least one node of the MapReduce system based on wait time of an application to be executed in the at least one node and the resource utilization vale of the at least one node obtained by using a system performance model, obtaining maximum bandwidth value of hardware associated with the bottleneck for the at least one node, determining energy efficient value of central processing unit (CPU) frequency for the at least one node to remove the bottleneck by using data throughput value of the at least one node obtained from the system performance model the system performance model and the maximum bandwidth value of the hardware of the at least one node associated with the bottleneck and setting the CPU frequency of the at least one node at the energy efficient value to perform a task.

In another embodiment, a non-transitory computer readable storage medium for improving energy efficiency of MapReduce without changing any component of the MapReduce system is disclosed. The computer readable storage medium which is not a signal stores computer executable instructions for determining presence of a hardware bottleneck in at least one node of the MapReduce system based on wait time of an application to be executed in the at least one node and the resource utilization vale of the at least one node obtained by using a system performance model, obtaining maximum bandwidth value of hardware associated with the bottleneck for the at least one node, determining energy efficient value of central processing unit (CPU) frequency for the at least one node to reduce the bottleneck by using data throughput value of the at least one node obtained from the system performance model the system performance model and the maximum bandwidth value of the hardware of the at least one node associated with the bottleneck and setting the CPU frequency of the at least one node at the energy efficient value to perform a task.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. These simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a method, apparatus, and computer readable medium for improving energy efficiency of MapReduce operations without changing any component of the MapReduce system. This involves determining presence of any bottleneck in any node of MapReduce system based on a system performance model and if any bottleneck is present in any node, then the maximum bandwidth value of hardware associated with the bottleneck of each node is determined. The hardware includes various computing devices having non-transient memory, such as hard disk, a CPU, and a network interface. Thereafter, an energy efficient value of Central Processing Unit (CPU) frequency of each node having the bottleneck is determined by using the system performance model and the maximum bandwidth value of network or hardware associated with the bottleneck. Further, the CPU frequency of each node having the bottleneck is set at the energy efficient value determined in the earlier step.

Figure 1:
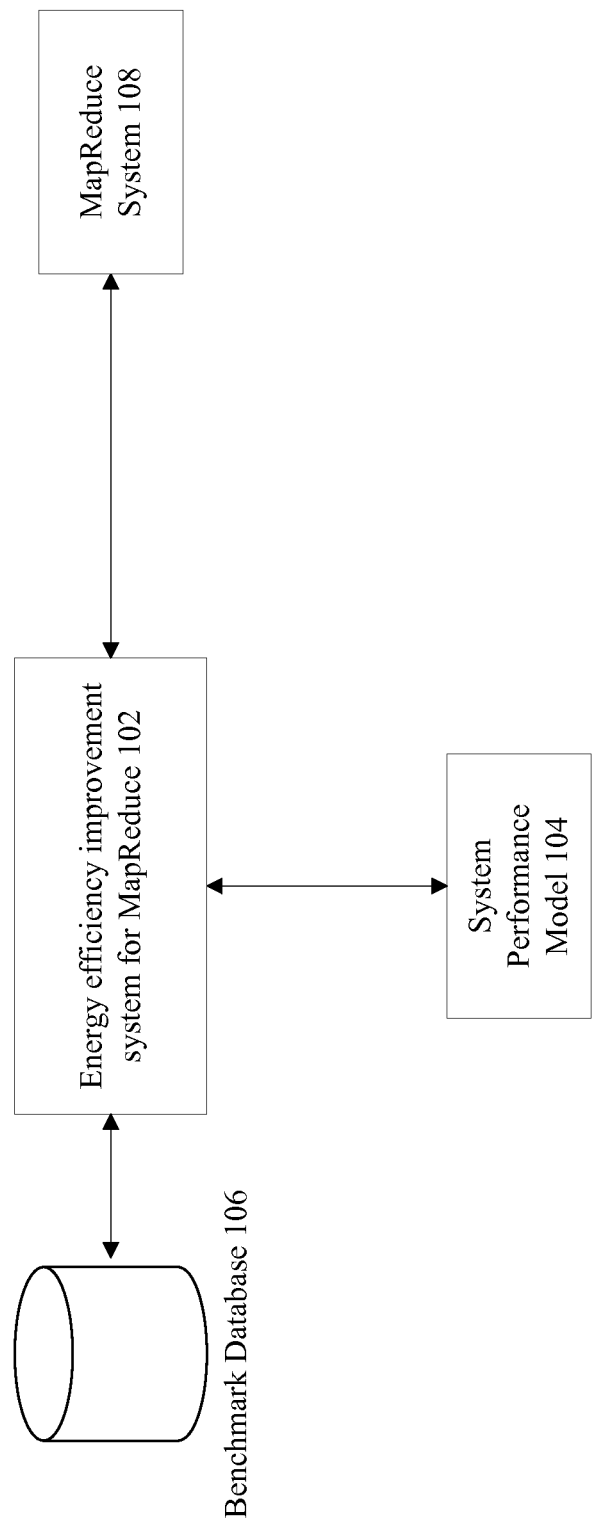
FIG. 1 is a schematic block diagram illustration of a computing environment capable of implementing the embodiments presented herein.

FIG. 1 is a computing environment capable of implementing the embodiments presented herein. The computing environment includes energy efficiency improvement system for MapReduce 102, system performance model 104, benchmark database 106 and MapReduce system 108. The energy efficient improvement system 102 uses system performance model 104 to determine the presence of a bottleneck in any node of the MapReduce system 108. System performance model 104 is described below in detail. The energy efficiency improvement system 102 fetches maximum bandwidth value of network or hardware of each node associated with the bottleneck from the benchmark database 106. The energy efficiency improvement system 102 uses the system performance model 104 along with the benchmark database 106 to determine the energy efficient value of CPU frequency of each node of the MapReduce system 108 having the bottleneck to overcome it. All data is stored in data structures, such as tables and databases.

Figure 2:
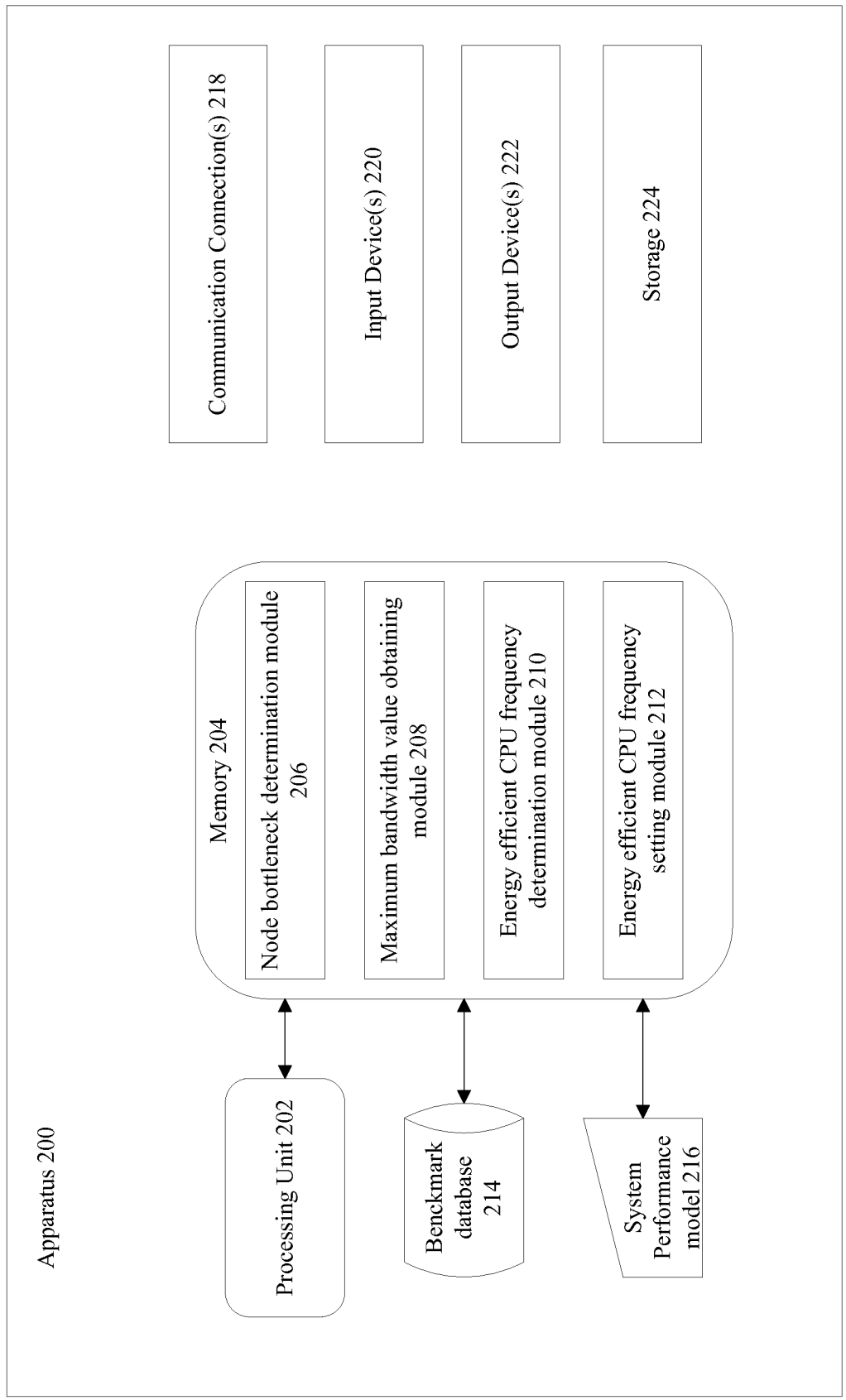
FIG. 2 is a schematic block diagram illustrating an apparatus for improving energy efficiency of MapReduce without changing any component of the MapReduce system, in accordance with an embodiment.

FIG. 2 is a block diagram illustrating an apparatus for improving energy efficiency of MapReduce without changing any component of the MapReduce system, in accordance with an embodiment of the present invention. The apparatus includes processing unit or processor 202, memory 204, benchmark database 214 and system performance model 216. The processor 202 executes a program of instructions stored on non-transient media for one or more aspects of the present technology as described and illustrated by way of the examples herein, although other types and numbers of processing devices and logic could be used and the processor could execute other numbers and types of programmed instructions. The memory 204 stores these programmed instructions for one or more aspects of the present technology as described and illustrated by way of the examples herein, although some or all of the programmed instructions could be stored and executed elsewhere.

A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 202, can be used for the memory 204. The memory 204 also includes node bottleneck determination engine 206, maximum bandwidth value obtaining engine 208, energy efficient CPU frequency determination engine 210 and energy efficient CPU frequency setting engine 212. The node bottleneck determination engine 206 is configured to determine presence of a bottleneck in at least one node of the MapReduce system based on a system performance model 216. This system performance model 216 is similar to the system performance model 104 mentioned in FIG. 1.

In various embodiments of the present disclosure, the "bottleneck" can include a network or hardware bottleneck. Again, a hardware bottleneck can include a disk, CPU or memory bottleneck. The system performance model 216 analyses the MapReduce system to determine response time, data as well as jobs throughput and one or more resource utilizations. The details regarding system performance model 216 is described herein below. The maximum bandwidth value obtaining engine 208 is configured to obtain maximum bandwidth value of network or hardware associated with the bottleneck for each node by running one or more benchmarks stored in a benchmark database 214 on the node(s) having the bottleneck. The benchmark database 214 described here is similar to the database 106 of FIG. 1. The maximum bandwidth value includes maximum disk bandwidth, maximum network bandwidth, maximum memory bandwidth or maximum CPU data processing rate of the node having the bottleneck.

The energy efficient CPU frequency determination engine 210 is configured to determine energy efficient value of central processing unit (CPU) frequency for the node having the bottleneck by using the system performance model 216 and the maximum bandwidth value of the network or hardware of that node associated with the bottleneck. The system performance model 216 determines the service demand and the data throughput at a certain CPU frequency. If the data throughput value of the bottlenecked node matches with the maximum bandwidth value of the network or hardware associated with the bottleneck in that node, then it is considered as the energy efficient CPU frequency at which the task is performed without much delay. This is described in detail herein below. The energy efficient CPU frequency setting engine 212 is configured to set the CPU frequency of the bottlenecked node at the calculated energy efficient value to perform a task.

The apparatus 200 may have additional features. For example, the apparatus 200 includes storage 224, one or more input devices 220, one or more output devices 224, and one or more communication connections 218. An interconnection mechanism (not shown) such as a bus, a controller, or a network, interconnects the components of the apparatus 200.

Figure 3:
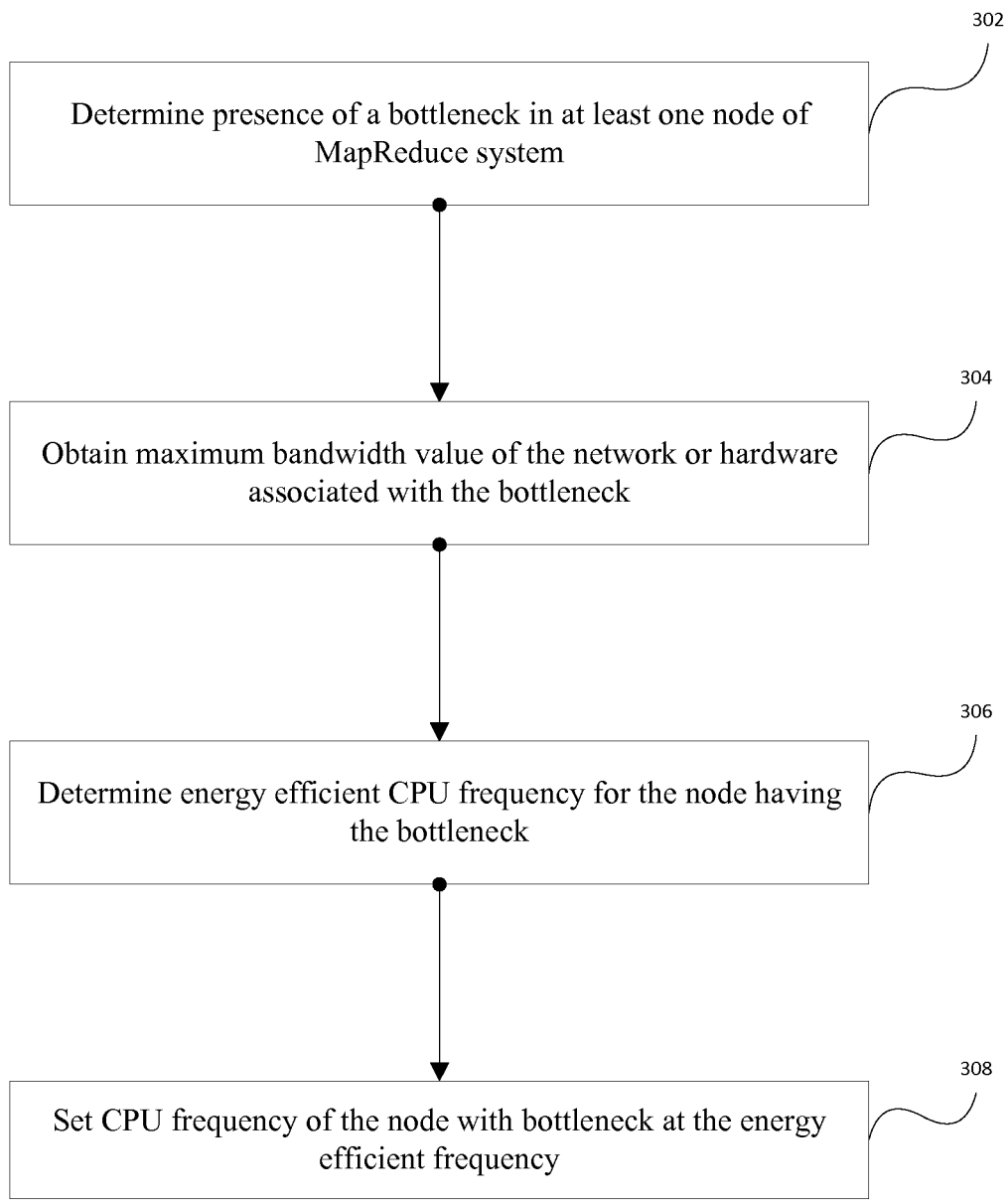
FIG. 3 is a flowchart, illustrating a method for improving energy efficiency of MapReduce without changing any component of the MapReduce system, in accordance with an embodiment.

FIG. 3 is a flowchart, illustrating a method for improving energy efficiency of MapReduce without changing any component of the MapReduce system, in accordance with an embodiment. The presence of a bottleneck in any node of the MapReduce system is determined at step 302. This is determined by using a system performance model. In various embodiments of the present disclosure, the system performance model is an abstract representation of the application run time performance as to how a given application utilizes given resources. The examples of commonly used performance model includes, but are not limited to Queuing network model (QNM) and Layered Queuing Network model (LQN). A queuing network model represents the system as a network of queues. It includes service centers which represent resources and requests which represents different transactions in the application. Layered queuing network (LQN), an extension of QNM, is used to model software contention. It models multiple instances of different software components deployed on a resource as tasks on a service center. The LQN model is represented as a directed acyclic graph (DAG) where each node represents a task, and a directed arc between two nodes indicates a service request by first node to second node. A task, represented by a node, includes a client (called reference-task in LQN parlance) which only sends requests to other nodes. A task includes server type (or a server-task), which receives and process requests, and also sends requests to other nodes. A server node has a request queue, where the requests wait for their turn to be served as they arrive. The default scheduling policy of the request queue is First In First Out. A node has one or more entries, where each entry models a type of service that this node offers. Each entry has its own service time. Each entry, in turn consists of a set of activities. Activities are connected together forming a directed graph that model a sequential or a parallel thread of control. From one activity, there can be an AND-fork that starts a set of successor activities to start in parallel once the execution of this activity is completed. An activity, like an entry, has its own service demand. In many cases, the service demands of entities and activities are assumed to be exponentially distributed.

Figure 4:
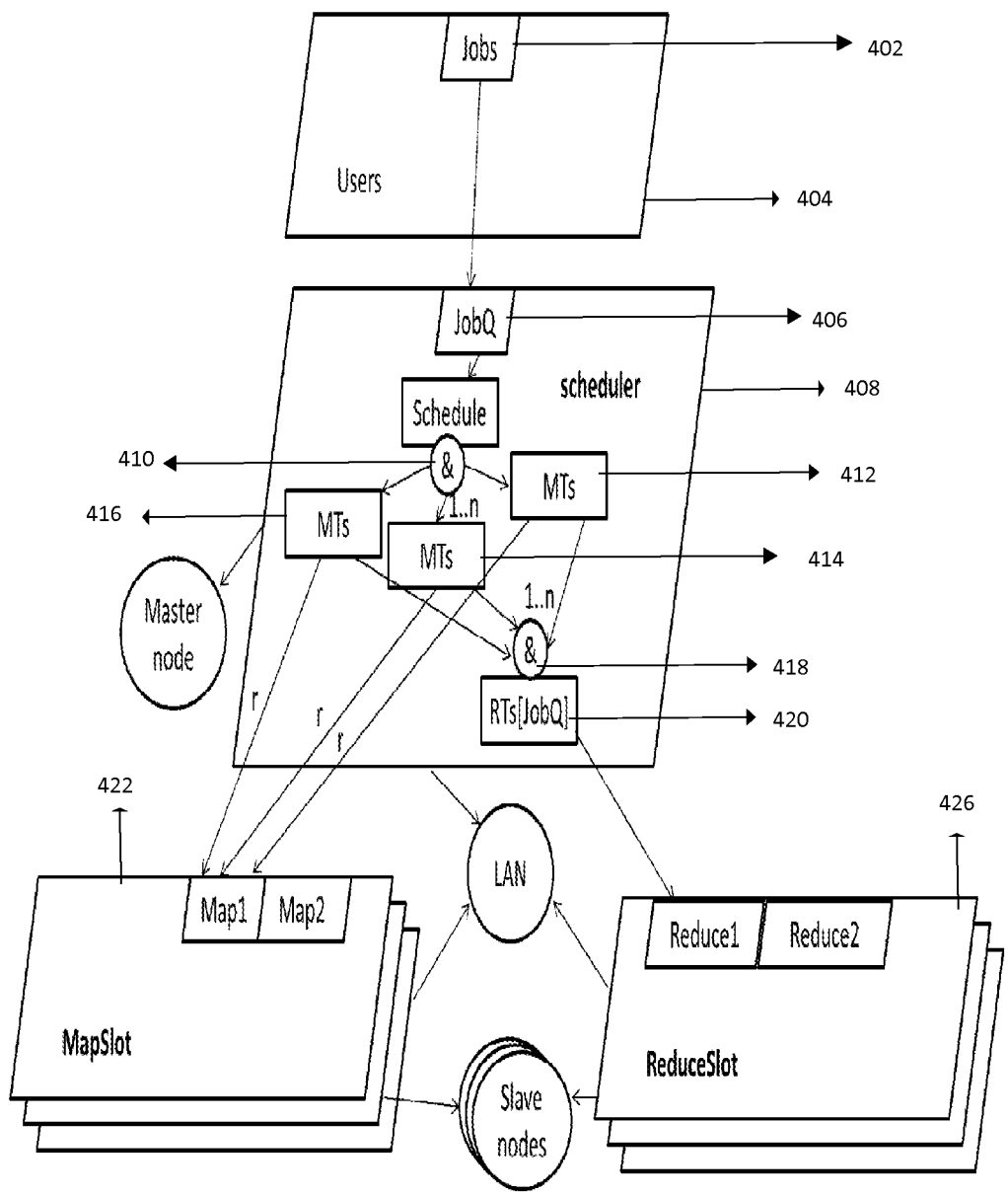
FIG. 4 is an exemplary Layered Queuing Network model (LQN) model of MapReduce system, in accordance with an embodiment.

This model is defined based on the transaction flow through various software components. Subsequently, this model is parameterized using the test results on a given set of hardware resources of the nodes of the MapReduce system. There are different ways to model a MapReduce system using LQN model techniques. An exemplary diagram illustrating a LQN model of MapReduce system is depicted in FIG. 4. In this figure, the scheduler 408, map-slot 422 and reduce-slot 426 is modeled as different "LQN tasks" of the LQN model. Furthermore, a job 402 submitted to a MapReduce system is modeled as a reference-task. The configuration of MapReduce cluster will determine the number of instances of map-slot and reduce-slot LQN tasks. The map and reduce tasks of different jobs will form the entries of map slot and reduce slot "LQN tasks", each having different service times. A job 402, which is a reference-task in LQN model will initiate a job execution by invoking the JobQ 406 entry of scheduler-tasknode, which in turn, will start the schedule activity as shown in the Figure. The schedule activity in scheduler-task-node will use "AND fork" 410 to call map entries (412, 414 and 416) in parallel. The calls will be repeated depending on the input data volumes. The "AND join" 418 of map entries (412, 414 and 416) will be used to invoke the reduce entry 420 of reduce-slot-task.

This model is used to study the application behavior for different workloads and also the application behavior on different hardware. This simulates the application behavior at run time. In a preferred embodiment, a Poisson arrival distribution is used to simulate the workload on the system. This system performance model keeps track of maximum wait time for an application to be executed and also the utilization level of each resources of the nodes in MapReduce system. If the utilization level of any resource of a particular node reaches 100% and wait time in that node increases then that node is considered as bottlenecked. Maximum bandwidth value of the network or hardware associated with the bottleneck for a node is obtained at step 304. This value is obtained by running one or more benchmarks on the bottlenecked node(s). The example of few such benchmarks includes but is not limited to Spec CPU2006 (CPU benchmark), Nbench (CPU and memory benchmark), sysbench (memory benchmark), isotone (disk benchmark), netio (network benchmark), bonnie++ (I/O benchmarks). The energy efficient CPU frequency for the bottlenecked node is determined at step 306. For this, the system performance model is analyzed using the Mean Value Analysis (MVA) algorithm and/or simulation to get the data throughput at a different CPU frequencies iteratively for the bottlenecked node. The data throughput is determined based on the service demand of each transaction on the resources. The service demand is the average service requirement of a customer transaction on a particular resource at given frequency. This service demand for each node is determined based on utilization law or code profilers. The system performance model is parameterized by providing this service demand value to obtain various data throughput values. This data throughput value is then used to find out the energy efficient CPU frequency for the bottlenecked node.

Figure 5:
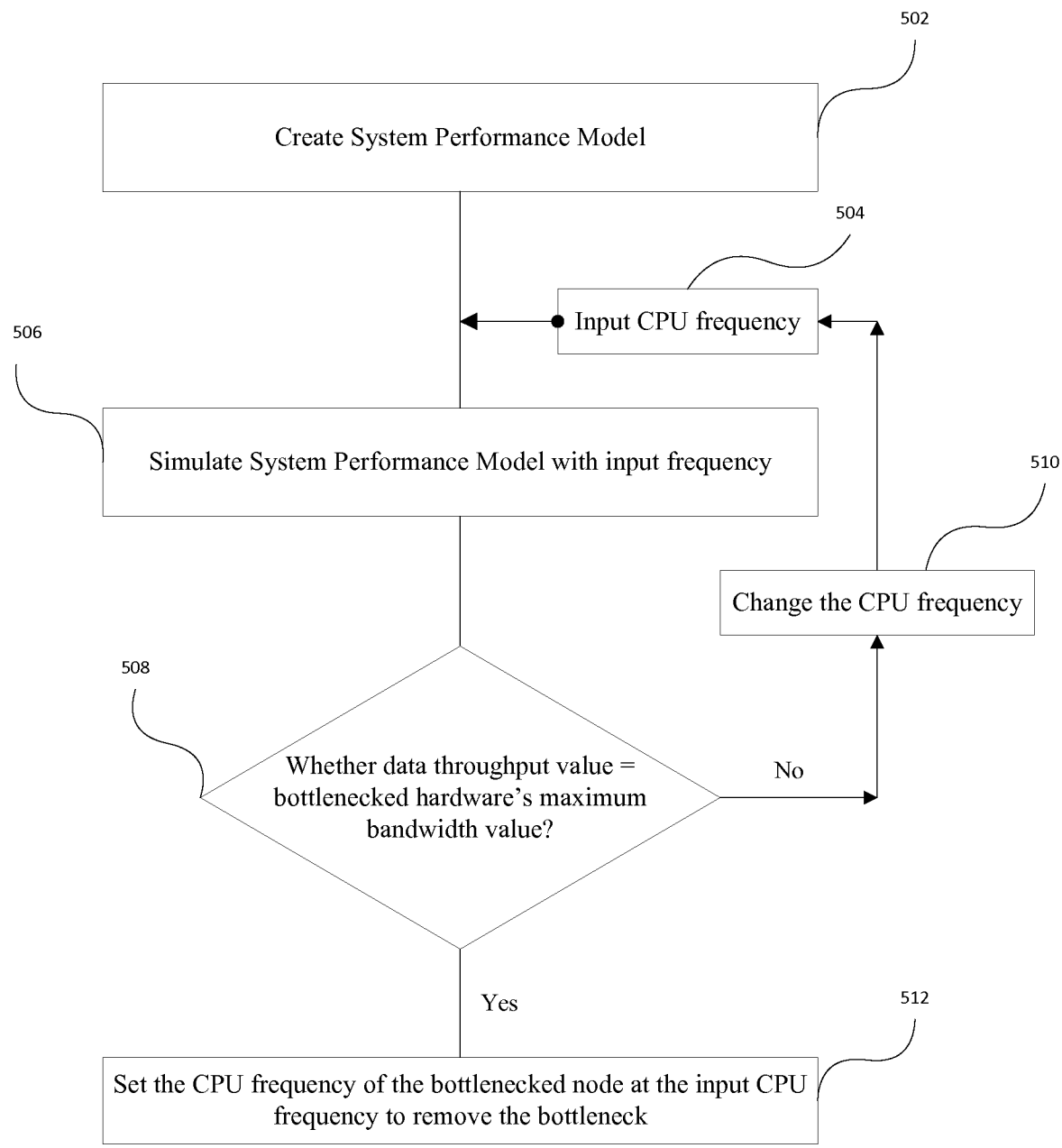
FIG. 5 is a flowchart, illustrating a method to determine the energy efficient CPU frequency to remove node bottleneck, in accordance with an embodiment.

FIG. 5 is a flowchart, illustrating a method to determine the energy efficient CPU frequency to remove node bottleneck. At step 502, system performance model (as mentioned herein above) is created. Then, a low CPU frequency is provided to the System performance model as an input for the CPU feeding data to bottlenecked hardware/node, at mentioned at 504. The system performance model is simulated with the input CPU frequency, as mentioned in step 506. This simulation generates the data throughput value of the bottlenecked node in MapReduce system. Next, it is determined if the data throughput value of the bottlenecked node matches with the maximum bandwidth value of the bottlenecked hardware, at step 508. If the data throughput value does not match with the maximum bandwidth of the bottlenecked hardware then a different CPU frequency is provided as an input to the system performance model, as shown in 510. On the other hand, if the data throughput value matches with the maximum bandwidth value of the bottlenecked hardware then the CPU frequency of that node is set at the input CPU frequency of 504, as mentioned in step 512. This can be explained with the help of following examples. If the bottleneck is associated with the disk of the node, then at which CPU frequency the data throughput value of the CPU=maximum disk bandwidth of that node, that CPU frequency is considered as the energy efficient CPU frequency for that node. Similarly, if the bottleneck is associated with memory of the node, then at which CPU frequency the data throughput value of the CPU=maximum memory bandwidth of that node, that CPU frequency is considered as the energy efficient CPU frequency for that node. Further, if the bottleneck is associated with network of the node, then at which CPU frequency the data throughput value of the node=maximum network bandwidth of that node, that CPU frequency is considered as the energy efficient CPU frequency for that node. Again, if the bottleneck is associated with CPU of the node, then the CPU frequency for that node is set such that the total CPU frequency (bytes/sec)=bottlenecked node's total CPU frequency (bytes/sec). If any bottleneck is present in any node and it has been observed that the bottleneck is due to a non-local task, then the same removed by setting the CPU frequency of that node at which the data throughput of the CPU=maximum network bandwidth of that node. If MapReduce system launches a non-local task on the node then the energy efficient CPU frequency of that node will be that frequency at which the data throughput value of the node=maximum network bandwidth of that node. At step 308 of FIG. 3, the CPU frequency of the bottlenecked node is set at the calculated energy efficient CPU frequency value to perform a task on that node.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer-implemented method for improving energy efficiency of a computing system running a MapReduce procedure of a MapReduce system, comprising:
    determining, by a computing device, a presence of a hardware bottleneck in at least one node of the MapReduce system based on a wait time of an application waiting to be executed in the at least one node and the resource utilization value of the at least one node obtained by using a system performance model;
    obtaining, by a computing device, a maximum bandwidth value of hardware of the at least one node with the hardware bottleneck, wherein the hardware is associated with the hardware bottleneck for the at least one node, wherein the obtaining comprises:
        retrieving one or more benchmarks from a benchmark database, and
        running the one or more benchmarks on the at least one node with the hardware bottleneck to determine the maximum bandwidth value of the hardware associated with the hardware bottleneck of the at least one node;
    determining, by a computing device, an energy efficient value of a central processing unit (CPU) frequency for the at least one node to remove the hardware bottleneck by using a data throughput value of the at least one node obtained from the system performance model and the maximum bandwidth value of the hardware associated with the hardware bottleneck of the at least one node with the hardware bottleneck, wherein the determining comprises:
        simulating the system performance model with an input CPU frequency of the at least one node with the hardware bottleneck to generate the data throughput value,
        comparing the data throughput value to the maximum bandwidth value of the of the hardware associated with the hardware bottleneck, and
        producing the energy efficient value as a CPU frequency that reduces the data throughput value of the CPU to match the maximum bandwidth value of the hardware with the hardware bottleneck; and
    setting, by a computing device, the CPU frequency of the at least one node at the energy efficient value to perform a task.

2. The method of claim 1, wherein the hardware bottleneck includes a disk, CPU, network or memory bottleneck.

3. The method of claim 1, wherein the system performance model analyses the MapReduce system to determine response time, the data throughput value and one or more resource utilizations.

4. The method of claim 1, wherein the maximum bandwidth value is determined by running one or more benchmarks on the at least one node.

5. The method of claim 1, wherein the maximum bandwidth value comprises a maximum disk bandwidth, maximum network bandwidth, maximum memory bandwidth or maximum CPU data processing rate of the at least one node.

6. The method of claim 1, wherein at the energy efficient CPU frequency the data throughput value of the at least one node matches with the maximum bandwidth value of the network or hardware of the at least one node associated with the bottleneck.

7. An apparatus for improving energy efficiency of a MapReduce system without changing any component of the MapReduce system, comprising:
one or more processors; and
one or more memory units operatively coupled to at least one of the one or more processors and having instructions stored thereon that, when executed by at least one of the one or more processors, cause at least one of the one or more processors to:
determine presence of a hardware bottleneck in at least one node of the MapReduce system based on wait time of an application to be executed in the at least one node and the resource utilization value of the at least one node obtained by using a system performance model;
obtain a maximum bandwidth value of hardware of the at least one node with the hardware bottleneck, wherein the hardware is associated with the hardware bottleneck for the at least one node, wherein the obtaining comprises:
retrieving one or more benchmarks from a benchmark database, and
running the one or more benchmarks on the at least one node with the hardware bottleneck to determine the maximum bandwidth value of the hardware associated with the hardware bottleneck of the at least one node;
determine an energy efficient value of central processing unit (CPU) frequency for the at least one node to remove the hardware bottleneck by using a data throughput value of the at least one node obtained from the system performance model and the maximum bandwidth value of the hardware associated with the hardware bottleneck of the at least one node with the bottleneck, wherein the determining comprises:
simulating the system performance model with an input CPU frequency of the at least one node with the hardware bottleneck to generate the data throughput value,
comparing the data throughput value to the maximum bandwidth value of the of the hardware associated with the hardware bottleneck, and
producing the energy efficient value as a CPU frequency that reduces the data throughput value of the CPU to match the maximum bandwidth value of the hardware with the hardware bottleneck; and
set the CPU frequency of the at least one node at the energy efficient value to perform a task.

8. The apparatus of claim 7, wherein hardware bottleneck includes a disk, CPU, network or memory bottleneck.

9. The apparatus of claim 7, wherein the system performance model analyses the MapReduce system to determine response time, the data throughput value and one or more resource utilizations.

10. The apparatus of claim 7, wherein the maximum bandwidth value is determined by running one or more benchmarks on the at least one node.

11. The apparatus of claim 10, wherein the one or more benchmarks are stored in a repository.

12. The apparatus of claim 7, wherein the maximum bandwidth value comprises a maximum disk bandwidth, maximum network bandwidth, maximum memory bandwidth or maximum CPU data processing rate of the at least one node.

13. The apparatus of claim 7, wherein at the energy efficient CPU frequency the data throughput value of the at least one node matches with the maximum bandwidth value of the network or hardware of the at least one node associated with the bottleneck.

14. At least one non-transitory computer-readable medium storing computer-readable instructions that, when executed by one or more computing devices, cause at least one of the one or more computing devices to:
determine presence of a hardware bottleneck in at least one node of a MapReduce system based on wait time of an application to be executed in the at least one node and the resource utilization value of the at least one node obtained by using a system performance model;
obtain a maximum bandwidth value of hardware of the at least one node with the hardware bottleneck, wherein the hardware is associated with the hardware bottleneck for the at least one node, wherein the obtaining comprises:
retrieving one or more benchmarks from a benchmark database, and
running the one or more benchmarks on the at least one node with the hardware bottleneck to determine the maximum bandwidth value of the hardware associated with the hardware bottleneck;
determine an energy efficient value of a central processing unit (CPU) frequency for the at least one node to remove the hardware bottleneck by using a data throughput value of the at least one node obtained from the system performance model and the maximum bandwidth value of the hardware associated with the hardware bottleneck of the at least one node with the hardware bottleneck, wherein the determining comprises:
simulating the system performance model with an input CPU frequency of the at least one node with the hardware bottleneck to generate the data throughput value,
comparing the data throughput value to the maximum bandwidth value of the of the hardware associated with the hardware bottleneck, and
producing the energy efficient value as a CPU frequency that reduces the data throughput value of the CPU to match the maximum bandwidth value of the hardware with the hardware bottleneck; and
set the CPU frequency of the at least one node at the energy efficient value to perform a task.

15. The non-transitory computer readable medium of claim 14, wherein hardware bottleneck includes a disk, CPU, network or memory bottleneck.

16. The non-transitory computer readable medium of claim 14, wherein the system performance model analyses the MapReduce system to determine response time, the data throughput value and one or more resource utilizations.

17. The non-transitory computer readable medium of claim 14, wherein the maximum bandwidth value comprises a maximum disk bandwidth, maximum network bandwidth, maximum memory bandwidth or maximum CPU data processing rate of the at least one node.

18. The non-transitory computer readable medium of claim 14, wherein at the energy efficient CPU frequency the data throughput value of the at least one node matches with the maximum bandwidth value of the network or hardware of the at least one node associated with the bottleneck.

19. The method of claim 1, wherein the system performance model comprises a queuing network model.

20. The non-transitory computer readable medium of claim 14, wherein the system performance model comprises a queuing network model representing the MapReduce system as a network of queues wherein at least one of the queues is associated with the at least one node of the MapReduce system.

* * * * *